United States Patent
Hsu et al.

(10) Patent No.: US 10,236,755 B2
(45) Date of Patent: Mar. 19, 2019

(54) METHOD FOR MANUFACTURING ROTORS

(71) Applicant: TECO Electric & Machinery Co., Ltd., Taipei (TW)

(72) Inventors: Meng-Yuan Hsu, Taipei (TW); Lian-Shin Hung, Taipei (TW); Cheng-Hsuan Shih, Taipei (TW); Chi-Hsin Wang, Taipei (TW); Sheng-Yi Wang, Taipei (TW)

(73) Assignee: Teco Electric & Machinery Co., Ltd., Taipei (TW)

( * ) Notice: Subject to any disclaimer, the term of this patent is extended or adjusted under 35 U.S.C. 154(b) by 343 days.

(21) Appl. No.: 15/278,468

(22) Filed: Sep. 28, 2016

(65) Prior Publication Data
US 2018/0041102 A1 Feb. 8, 2018

(30) Foreign Application Priority Data
Aug. 4, 2016 (TW) .............................. 105124772 A (51) Int. Cl.
*H02K 15/02* (2006.01)
*H02K 15/12* (2006.01)
*B23P 15/00* (2006.01)
*H02K 15/00* (2006.01)
*B23P 11/00* (2006.01)

(52) U.S. Cl.
CPC .............. *H02K 15/12* (2013.01); *B23P 15/00* (2013.01); *H02K 15/0012* (2013.01); *H02K 15/02* (2013.01); *H02K 15/024* (2013.01); *B23P 11/005* (2013.01)

(58) Field of Classification Search
CPC ..... B23P 15/00; H02K 15/0012; H02K 15/02; H02K 15/024; H02K 15/12
See application file for complete search history.

(56) References Cited

FOREIGN PATENT DOCUMENTS

| JP | 07099747 A | * | 4/1995 |
| JP | 10271772 A | * | 10/1998 |

* cited by examiner

*Primary Examiner* — Carl Arbes
(74) *Attorney, Agent, or Firm* — Muncy, Geissler, Olds & Lowe, P.C.

(57) ABSTRACT

A method includes steps of: preparing first and second plates, each first plate having surrounding apertures, each aperture including a first accommodation portion and an outer necking portion, each second plate having surrounding accommodation portions; stacking the first plates by aligning necking portions to form band gaps extending linearly and parallel to each other; stacking two second plates to two opposing terminal portions of the stacked first plates; penetrating metal bars into the aligned first and second accommodation portions by exposing both ends of each metal bar; beetling the necking portions at each band gap so as to locate firmly the corresponding metal bar; positioning a first mold and a second mold to clamp the stacked plate structure; injecting metal slurries into the first and second molds and then solidifying the metal slurries to form two end rings; and, removing the first and second molds to complete a rotor structure.

3 Claims, 9 Drawing Sheets

METHOD FOR MANUFACTURING ROTORS

This application claims the benefit of Taiwan Patent Application Serial No. 105124772, filed Aug. 4, 2016, the subject matter of which is incorporated herein by reference.

BACKGROUND OF INVENTION

1. Field of the Invention

The invention relates to a method for manufacturing rotors, and more particularly to the manufacturing method of rotors that applies a beetling process upon a necking portion of a stacked silicon steel plate with an implanted metal bar.

2. Description of the Prior Art

In the art, the mainstream of electric rotating machinery is the electric induction apparatus such as the motor. Since its excellent applicability and sturdiness, the electric induction apparatus is continuously and widely adopted. No matter in the manufacturing or livelihood industry, the electric induction apparatus always plays an important or key role. Thus, the electric rotating machinery can't be easily separated from people's daily life.

In particular, the slot shape of the rotor and the material used for interior walls of the slot are two major factors for this product to be successful in the market. In the art, some of the electric rotating machinery implements copper bars to be implanted into the rotor slots so as to promote the operational efficiency of the motor. Thereupon, merits of extension operations and energy saving can be obtained. However, shortcomings in heavier weight and higher cost would be yet to be resolved. By having a copper rotor for example, implanted copper bars are included on the cast copper rotor, by which the coefficient of resistance is low, the operational efficiency is high, energy consumption for continuous service can be substantially reduced, but the weight and cost are high.

On the other hand, by having the die-cast aluminum to produce the rotor, the startup torque is higher than that of the copper rotor, and the weight and cost are lower. However, the operational efficiency is downgraded. In the aluminum rotor, the rotor made of the cast aluminum is implanted with aluminum bars, through which, though the coefficient of resistance is high, the lower operational efficiency is yet to be improved.

Nevertheless, in the current art, while in forming the end ring after the copper bar or the aluminum bar is planted into the rotor slot, loosened engagement between the copper or aluminum bar and the silicon steel plate is usually met, from which the yield of the rotor would be significantly decreased.

SUMMARY OF THE INVENTION

In view of the current manufacturing methods of the rotors, the loosened bar in the slot is obvious one of reasons to reduce the production yield, and thus, accordingly, it is the primary object of the present invention to provide a method for manufacturing rotors that a beetling process upon apertures of stacked silicon steel plates is implemented after the silicon steel plates have been stacked and the metal bars have been implanted. Thereby, the aforesaid shortcomings in producing the rotors as described above can be substantially resolved.

In the present invention, the method for manufacturing rotors includes: a step of preparing a plurality of first silicon steel plates and at least two second silicon steel plates, an outer edge of each said first silicon steel plate being furnished with a plurality of apertures, each of the apertures further including a first accommodation portion away from the outer edge and a necking portion close to the outer edge, each of the at least two second silicon steel plates being furnished with a plurality of closed perforations, each of the closed perforations defining a second accommodation portion; a step of stacking the plurality of first silicon steel plates into a stacked first silicon steel structure by aligning corresponding necking portions of the stacked first silicon steel plates so as to have the necking portions to form a plurality of band gaps extending linearly, vertically and parallel to each other, each of the band gaps including a plurality of the necking portions; a step of stacking the at least two second silicon steel plates to two opposing terminal portions of the stacked first silicon steel structure; a step of having a plurality of metal bars to penetrate the aligned first accommodation portions of the plurality of first silicon steel plates and the aligned second accommodation portions of the at least two second silicon steel plates by having both ends of each said metal bar to expose out of the two corresponding terminal portions; a step of beetling at least one of the necking portions of each of the band gaps so as to locate firmly the plurality of metal bars; positioning a first mold and a second mold, respectively, onto the at least two second silicon steel plates mounted at the two terminal portions; a step of injecting metal slurries into the first mold and the second mold so as to allow the metal slurries to be solidified and thus form two end rings adhered to the two corresponding exposed terminal portions of each of the metal bars; and a step of removing the first mold and the second mold so as to form the stacked rotor structure completely.

In one embodiment of the present invention, each of the metal bars is an aluminum bar, and the metal slurry is a copper slurry.

In one embodiment of the present invention, each of the two exposed terminal portions of the metal bar includes at least one notch located on lateral surfaces of the metal bar; wherein, while the metal slurries are solidified to form the two end rings, each of the two end rings is fixed firmly to the corresponding exposed terminal portion of the metal bar in an interference manner.

In the present invention, since the beetling process is added, thus structural interference between the necking portion and the metal bar can be increased, and thereby the yield of the rotor structure can be substantially improved.

Further, in the present invention, since different materials are applied to the metal bar (copper) and the metal slurry (aluminum), advantages of individual materials (such as higher operational efficiency and lower cost) can be preserved. Thereupon, the performance of the motor can be substantially enhanced.

In addition, in the present invention, by further providing the notched to the two exposed terminal portions of the metal bar, thus possible looseness between two different materials (the end ring and the metal bar) caused by different coefficients of expansion can be significantly reduced, and thereby the production reliability can be ensured.

All these objects are achieved by the method for manufacturing rotors described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method for manufacturing rotors. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
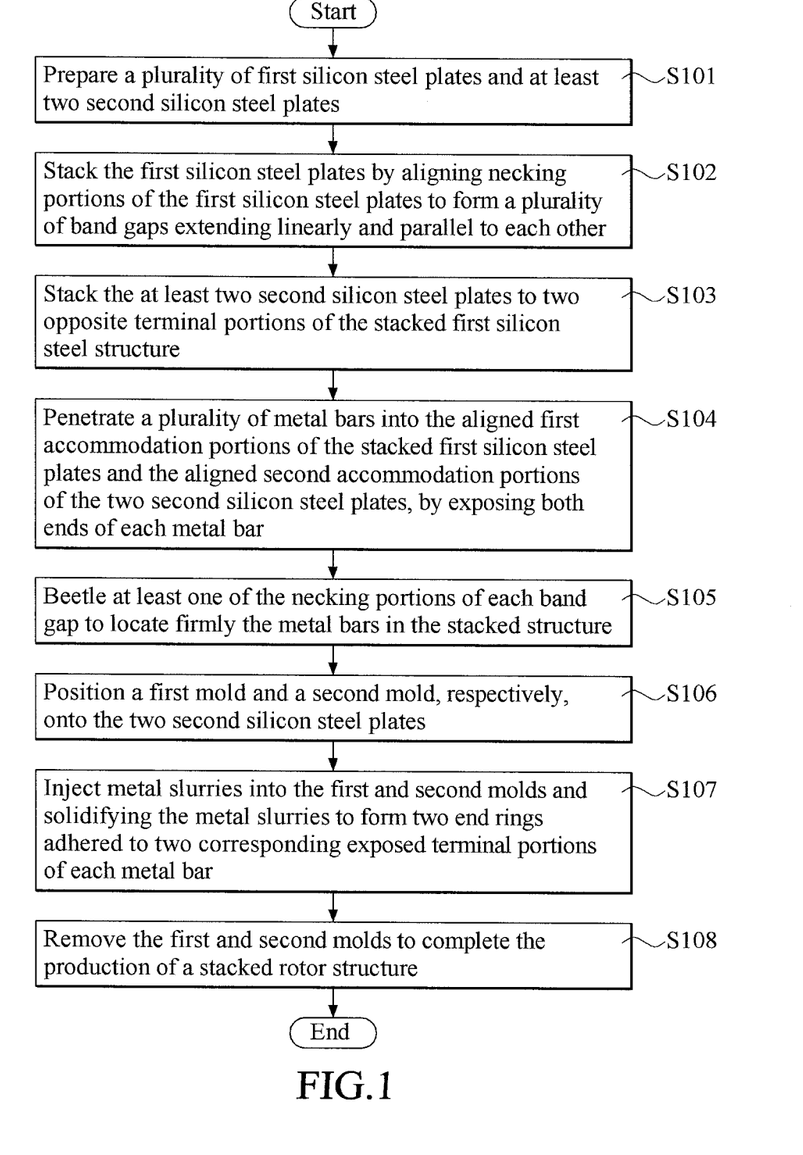
FIG. 1 is a flowchart of a preferred embodiment of the method for manufacturing rotors in accordance with the present invention.
Figure 2:
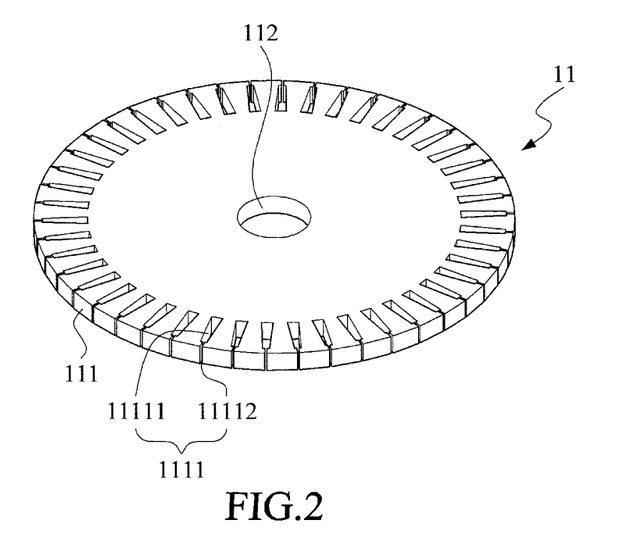
FIG. 2 is a schematic perspective view of a first silicon steel plate for the embodiment of FIG. 1.
Figure 3:
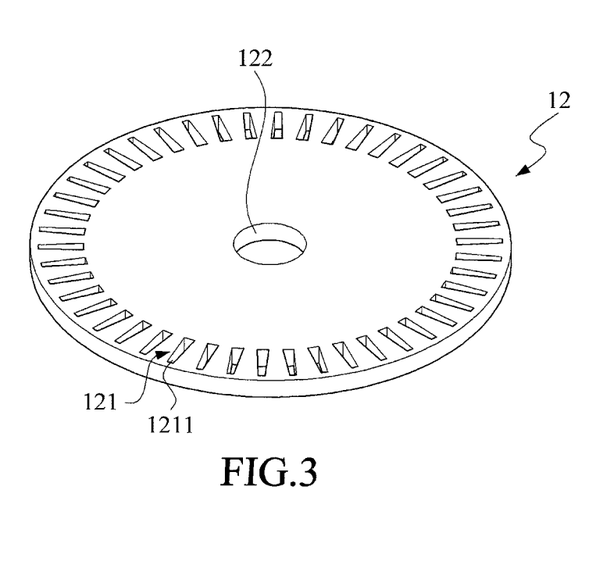
FIG. 3 is a schematic perspective view of a second silicon steel plate for the embodiment of FIG. 1.
Figure 4:
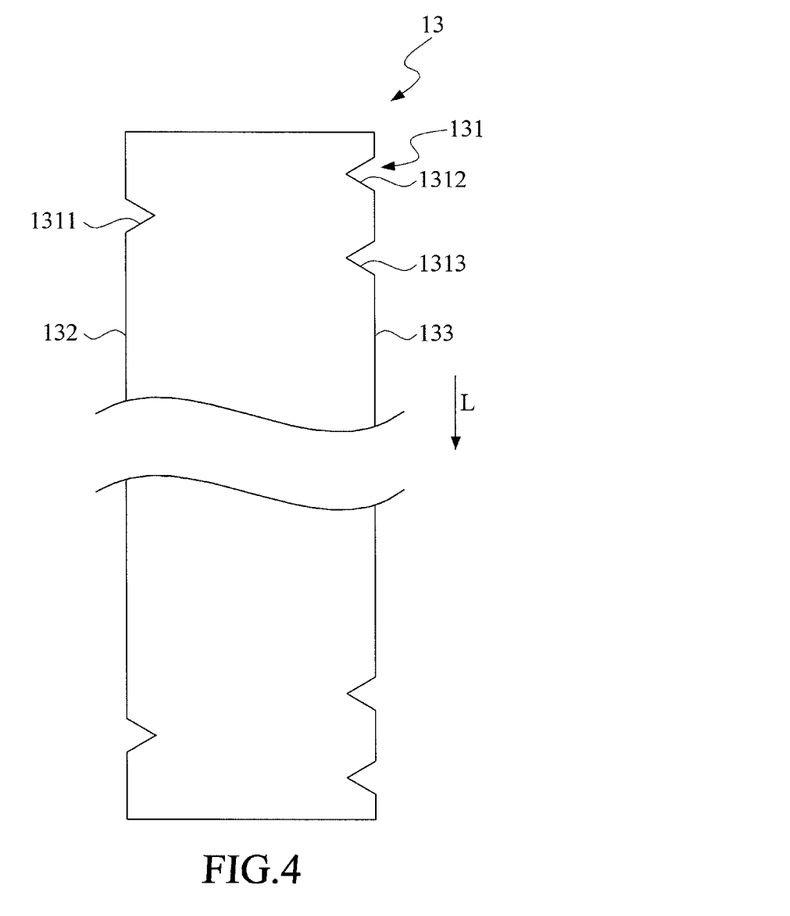
FIG. 4 is a schematic lateral side view of a metal bar for the embodiment of FIG. 1.
Figure 5:
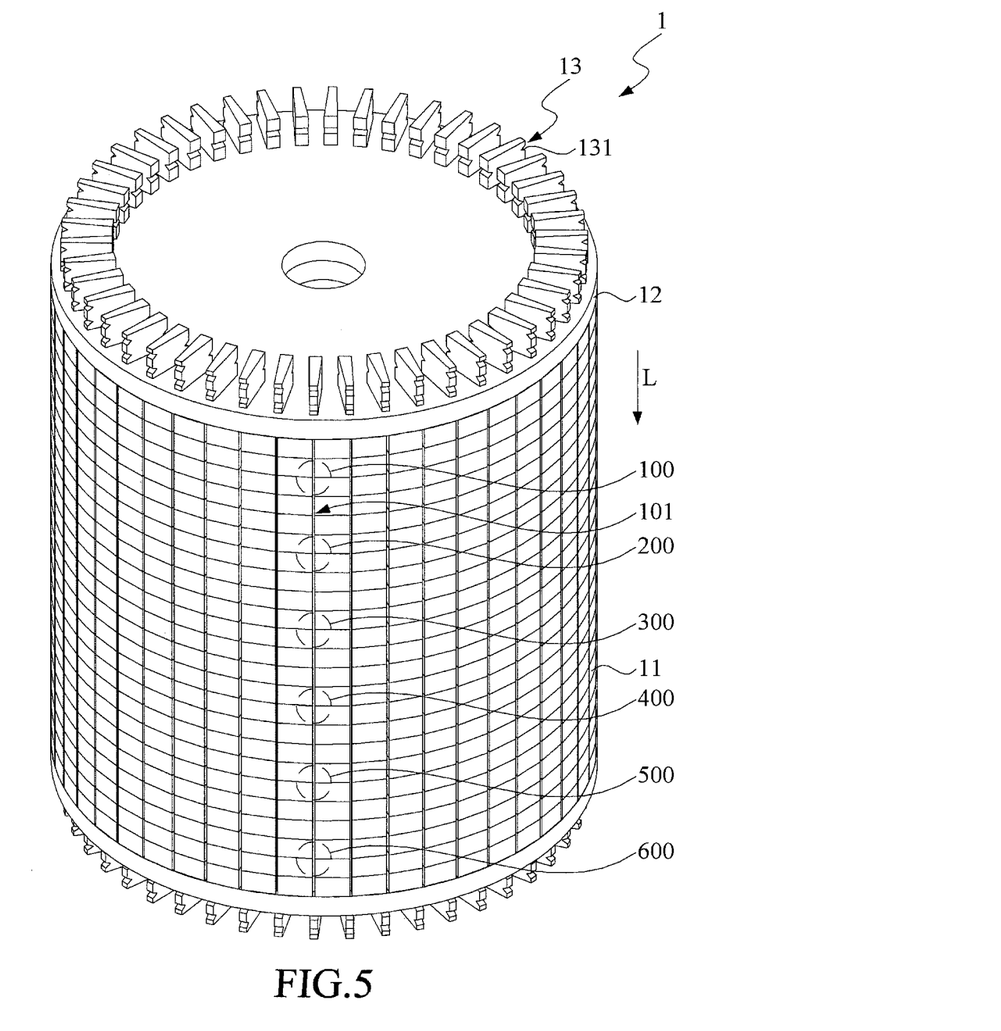
FIG. 5 is a schematic perspective view of a stacked structure including the first silicon steel plates and the second silicon steel plates for the embodiment of FIG. 1.
Figure 6:
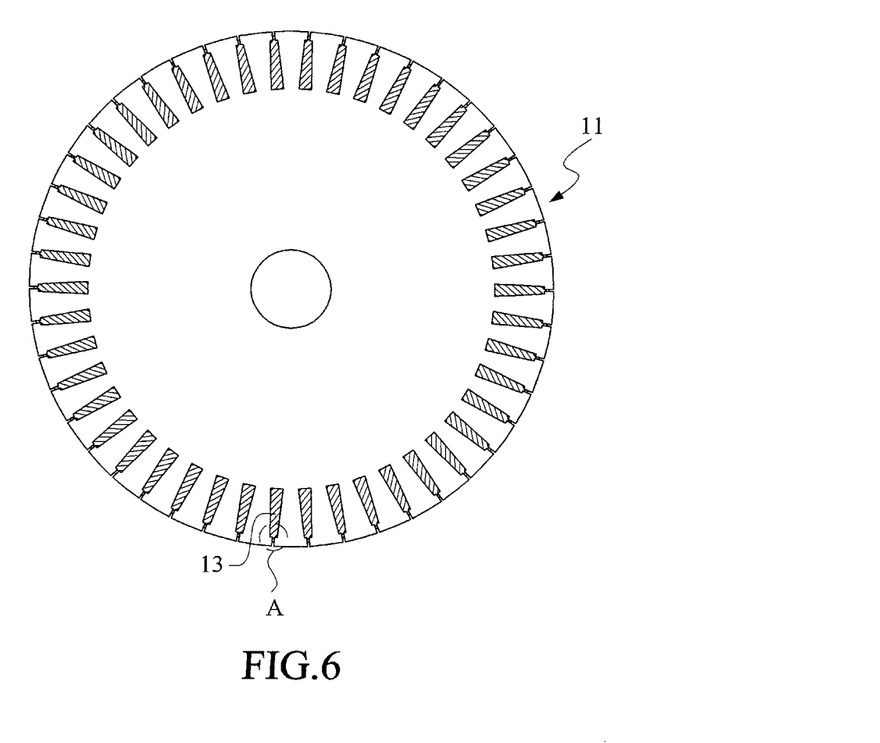
FIG. 6 is a schematic top view of the first silicon steel plate with implanted metal bars in the corresponding apertures after a beetling process of the embodiment of FIG. 1.
Figure 6A:
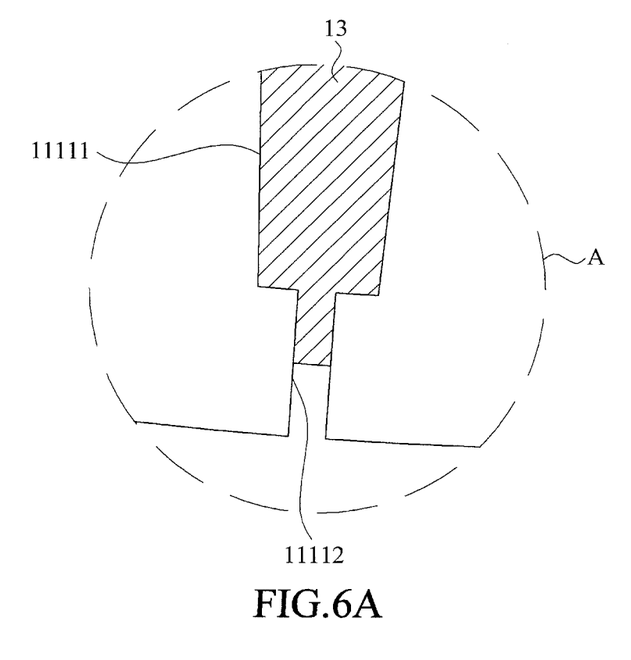
FIG. 6A is a schematic enlarged view of area A of FIG. 6.
Figure 7:
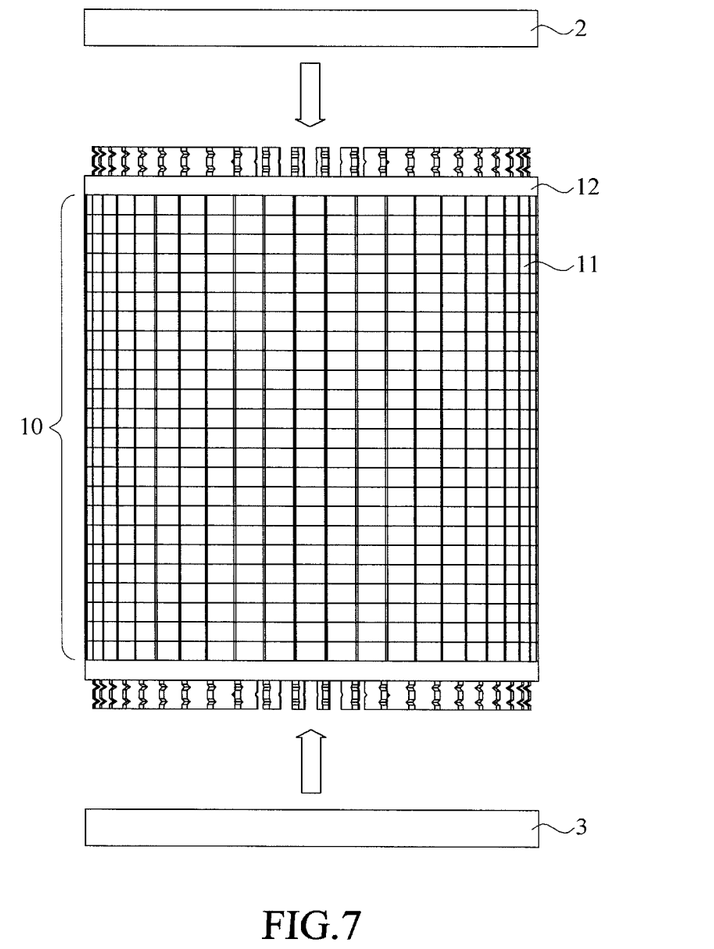
FIG. 7 is a schematic lateral side view of a first mold at top, the stacked structure of FIG. 5 in the middle and a second mold at bottom.
Figure 8:
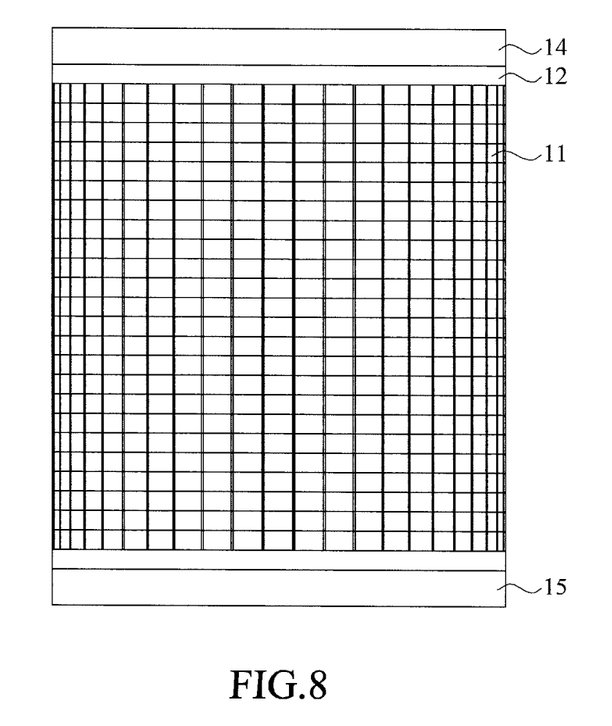
FIG. 8 is a schematic lateral side view of the rotor structure produced by the method of FIG. 1.

Refer to FIG. 1 to FIG. 8; where FIG. 1 is a flowchart of a preferred embodiment of the method for manufacturing rotors in accordance with the present invention, FIG. 2 is a schematic perspective view of a first silicon steel plate for the embodiment of FIG. 1, FIG. 3 is a schematic perspective view of a second silicon steel plate for the embodiment of FIG. 1, FIG. 4 is a schematic lateral side view of a metal bar for the embodiment of FIG. 1, FIG. 5 is a schematic perspective view of a stacked structure including the first silicon steel plates and the second silicon steel plates for the embodiment of FIG. 1, FIG. 6 is a schematic top view of the first silicon steel plate with implanted metal bars in the corresponding apertures after a beetling process of the embodiment of FIG. 1, FIG. 6A is a schematic enlarged view of area A of FIG. 6, FIG. 7 is a schematic lateral side view of a first mold at top, the stacked structure of FIG. 5 in the middle and a second mold at bottom, and FIG. 8 is a schematic lateral side view of the rotor structure produced by the method of FIG. 1.

As shown, the preferred embodiment of the method for manufacturing rotors in accordance with the present invention includes the following steps.

Step S101: Prepare a plurality of first silicon steel plates and at least two second silicon steel plates.

Step S102: Stack the plurality of first silicon steel plates into a stacked first silicon steel structure, by aligning corresponding necking portions of the stacked first silicon steel plates so as to have the necking portions to form a plurality of band gaps extending linearly, vertically and parallel to each other. Each of the band gaps includes a number of necking portions equal to the number of stacked first silicon steel plates.

Step S103: Stack the at least two second silicon steel plates to two opposite terminal portions of the stacked first silicon steel structure.

Step S104: Have a plurality of metal bars to penetrate the aligned first accommodation portions of the plurality of first silicon steel plates and the aligned second accommodation portions of the at least two second silicon steel plates, by having both ends of each the metal bar to expose out of the two corresponding terminal portions. Thereupon, a stacked structure including the first silicon steel plates and the second silicon steel plates is formed.

Step S105: Beetle at least one of the necking portions of each of the band gaps so as to locate thinly the plurality of metal bars in the stacked structure.

Step S106: Position a first mold and a second mold, respectively, onto the at least two second silicon steel plates mounted at the two terminal portions.

Step S107: Inject metal slurries into the first mold and the second mold, so as to allow the metal slurries to be solidified and thus form two end rings adhered to the two corresponding exposed terminal portions of each of the metal bars.

Step S108: Remove the first mold and the second mold so as to form the stacked rotor structure completely.

In Step S101, a plurality of first silicon steel plates 11 (one labeled in the figure) and at least two second silicon steel plates 12 (one labeled in the figure) are produced. The manufacturing method for the first silicon steel plate 11 and the second silicon steel plate 12 is already matured in the art, and thus details thereabout would be omitted herein. In this embodiment, each of the first silicon steel plates 11 has an outer edge 111 and a first central hole 112. The outer edge 111 is further furnished with a plurality of apertures 1111 (one labeled in the figure), so as to make the outer edge be an discontinuous edge including a plurality of sections separated by the apertures 1111. Each of the apertures 1111 includes a first accommodation portion 11111 located away from the outer edge 111 and a necking portion 11112 close to the outer edge 111. In the present invention, the first accommodation portion 11111 can be shaped to be a trapezoidal hole structure, an oval hole structure, or any hole structure the like. Further, the apertures 1111 are arranged to circle evenly the first central hole 112.

Each of the at least two second silicon steel plates 12 (one labeled in the figure) is furnished with a plurality of closed perforations 121 (one labeled in the figure) and a second central hole 122. The closed perforations 121 are to provide a plurality of second accommodation portions 1211 circling the second central hole 122. In the preferred embodiment of the present invention, the first accommodation portion 11111 and the second accommodation portion 1211 are structured to the same shape and size. Further, the first central hole 112 and the second central hole 122 are structured to be identical.

In addition, in Step S101 of the preferred embodiment of the present invention, a plurality of metal bars 13 (one labeled in the figure) is further prepared. Each of the two exposed terminal portions 131 (one labeled in the figure) of the metal bar 13 includes at least one notch (three 1311, 1312 and 1313 in this embodiment) located on the lateral surface of the metal bar 13 along an extension direction L. It shall be noted that the three notches 1311, 1312 and 1313 are arranged in an alternative manner. The notch 1311 is located on an inner surface 132 of the metal bar 13, while the other two notches 1312, 1313 are located on the outer surface 133 thereof opposing to the inner surface 132. Namely, the two exposed terminal portions 131 include the inner surface 132 and the outer surface 133. In addition, though this embodiment includes three notches 1311, 1312 and 1313, yet the other embodiment may include only a single notch 1311.

In Step S102, the plurality of first silicon steel plates 11 are stacked to produce the stacked first silicon steel structure 10 (labeled in FIG. 7), by aligning corresponding necking portions 11112 of the stacked first silicon steel plates 11 so as to have the necking portions 11112 to form a plurality of band gaps 101 extending linearly in an extension direction L, vertically and parallel to each other. Each of the band gaps 101 includes a number of the necking portions 11112 equal to the number of stacked first silicon steel plates 11.

In Step S103, stack the at least two second silicon steel plates 12 to two opposite terminal portions (not labeled in the figure) of the stacked first silicon steel structure 10. Namely, one of the second silicon steel plates 12 is stacked to a top of the stacked first silicon steel structure 10, while another thereof is stacked to a bottom of the stacked first silicon steel structure 10, by having the first accommodation portions 11111 to align the second accommodation portions 1211, and also by having the first central holes 112 to align the second central holes 122.

In Step S104, the plurality of metal bars 13 are implanted, by penetration, into the corresponding first accommodation portions 11111 of the plurality of first silicon steel plates 11 and the corresponding second accommodation portions 1211 of the at least two second silicon steel plates 12, by having both ends of each metal bars 13 to expose out of the two corresponding terminal portions 131. As shown, the inner surface 132 of the metal bar 13 faces the first central hole 112 and the second central hole 122, while the outer surface 133 thereof opposing the inner surface is away from the first central hole 112 and the second central hole 122. Thereupon, a stacked structure including the first silicon steel plates 11 and the second silicon steel plates 12 is formed.

In Step S105, apply beetling at least one of the necking portions 11112 of each of the band gaps 101 so as to deform partly the corresponding metal bars 13 in the stacked structure (as shown in FIG. 6 and FIG. 6A). Thereupon, the plurality of the metal bars 13 can be firmly fixed in the stacked structure. Practically, while in the beetling process, the beetled necking portion 11112 would be deformed firstly, and then the corresponding metal bar 13 would be partly deformed accordingly by having part of the metal bar 13 to protrude into the corresponding necking portion 11112.

For example, the Step S105 of the preferred embodiment of the present invention can be performed by beetling the necking portions 11112 in areas 100, 200, 300, 400, 500 and 600 of FIG. 5. It shall be noted that, though a single band gap 101 is included in each of areas 100, 200, 300, 400, 500 and 600 of FIG. 5, yet the beetling is applied to every band gaps 101 and the corresponding necking portions 11112 in that area. In addition, the beetling can be performed through a beetling machine.

In Step S106, the first mold 2 and the second mold 3 (both of which are natured in the art, and thus details thereabout are omitted herein) are positioned, respectively, onto the at least two second silicon steel plates 12 mounted at the two terminal portions of the stacked first silicon steel structure 10. Preferably, the first mold 2 and the second mold 3 are attached closely to the corresponding second silicon steel plates 12. However, in some other embodiments, the close attachment in between is not necessary.

In Step S107, metal slurries are injected into the first mold 2 and the second mold 3, so as to allow the metal slurries to be solidified and thus form two end rings 14, 15 (in FIG. 8) fixed with the two corresponding exposed terminal portions 131 of each of the metal bars 13. It shall be noted that, in the preferred embodiment of the present invention, the metal bar 13 can be (but not limited to) a copper bar, the metal slurry can be (but not limited to) an aluminum slurry. In addition, while the metal slurries are solidified to form the two end rings 14, 15, each of the two end rings 14, 15 is fixed firmly to the corresponding exposed terminal portion 131 of the metal bar 13 in an interference manner, and the existence of the notches 1311, 1312 and 1313 can further prevent the two end rings 14, 15 from being separated from the corresponding metal bars 13.

For example, in the case that materials for the metal bar 13 and the metal slurry are different, the individual coefficients of expansion would be different as well, and thus the adhesion between the metal bars 13 and the end rings 14 and 15 would be weak. However, the existence of the notches 1311, 1312 and 1313 can provide additional forcing to avoid possible separation of the end rings 14, 15 from the metal bars 13, especially in a high speed rotation.

In Step S108, the first mold 2 and the second mold 3 are removed so as to finish the production of the stacked rotor structure 1. As shown, the rotor structure 1 includes a plurality of the first silicon steel plates 11, two said second silicon steel plates 12, a plurality of the metal bars 13 and two said end rings 14, 15.

In summary, by providing the method for manufacturing rotors of the present invention, since an additional beetling process is applied to enhance structural interference between the necking portion and the metal bar, thus looseness of the metal bars with respect to the silicon steel plates would be avoided, and therefore the yield of the rotor structure can be significantly increased. In addition, different materials are applied to the metal bar (copper) and the metal slurry (aluminum), advantages of individual materials (such as higher operational efficiency and lower cost) can be preserved. Upon such an arrangement, the performance of the motor can be substantially enhanced. In addition, by further providing the notched to the two exposed terminal portions of the metal bar, thus possible looseness between two different materials (the end ring and the metal bar) caused by different coefficients of expansion can be significantly reduced, and thereby the production reliability can be ensured.

While the present invention has been particularly shown and described with reference to a preferred embodiment, it will be understood by those skilled in the art that various changes in form and detail may be without departing from the spirit and scope of the present invention.

What is claimed is:

1. A method for manufacturing rotors, comprising the steps of:
   (a) preparing a plurality of first silicon steel plates and at least two second silicon steel plates, an outer edge of each said first silicon steel plate being furnished with a plurality of apertures, each of the apertures including a first accommodation portion away from the outer edge, and further including a necking portion close to the outer edge, each of the at least two second silicon steel plates being furnished with a plurality of closed perforations, each of the closed perforations defining a second accommodation portion;
   (b) stacking the plurality of first silicon steel plates into a stacked first silicon steel structure by aligning corresponding necking portions of the stacked first silicon steel plates so as to have the necking portions to form a plurality of band gaps extending linearly, vertically and parallel to each other, each of the band gaps including a plurality of the necking portions;

(c) stacking the at least two second silicon steel plates to two opposing terminal portions of the stacked first silicon steel structure;

(d) having a plurality of metal bars to penetrate the aligned first accommodation portions of the plurality of first silicon steel plates and the aligned second accommodation portions of the at least two second silicon steel plates by having both ends of each said metal bar to expose out of the two corresponding terminal portions;

(e) beetling at least one of the necking portions of each of the band gaps so as to locate firmly the plurality of metal bars;

(f) positioning a first mold and a second mold, respectively, onto the at least two second silicon steel plates mounted at the two terminal portions;

(g) injecting metal slurries into the first mold and the second mold so as to allow the metal slurries to be solidified and thus form two end rings adhered to the two corresponding exposed terminal portions of each of the metal bars; and (h) removing the first mold and the second mold so as to form the stacked rotor structure completely.

2. The method for manufacturing rotors of claim 1, wherein each of the metal bars is an aluminum bar, and the metal slurry is a copper slurry.

3. The method for manufacturing rotors of claim 1, wherein each of the two exposed terminal portions of the metal bar includes at least one notch located on lateral surfaces of the metal bar; wherein, while the metal slurries are solidified to form the two end rings, each of the two end rings is fixed firmly to the corresponding exposed terminal portion of the metal bar in an interference manner.

* * * * *